(12) United States Patent
Baqai et al.

(10) Patent No.: US 8,675,102 B2
(45) Date of Patent: Mar. 18, 2014

(54) REAL TIME DENOISING OF VIDEO

(71) Applicant: Apple Inc., Cupertino, CA (US)

(72) Inventors: Farhan A. Baqai, Fremont, CA (US); Jay Zipnick, Morgan Hill, CA (US); Haitao Guo, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/631,796

(22) Filed: Sep. 28, 2012

(65) Prior Publication Data

US 2013/0329135 A1 Dec. 12, 2013

Related U.S. Application Data

(60) Provisional application No. 61/662,065, filed on Jun. 20, 2012, provisional application No. 61/657,664, filed on Jun. 8, 2012.

(51) Int. Cl.
*H04N 5/217* (2011.01)

(52) U.S. Cl.
USPC ............................. 348/241; 382/264; 382/275

(58) Field of Classification Search
USPC ........................ 348/241, 222.1; 382/275, 264; 375/240.02, 240.29
See application file for complete search history.

(56) References Cited

U.S. PATENT DOCUMENTS

| | | | |
|---|---|---|---|
| 7,542,622 B1 | 6/2009 | Angelini et al. | |
| 2004/0066978 A1* | 4/2004 | Nanbu | 382/261 |
| 2009/0225827 A1 | 9/2009 | Sang et al. | |
| 2011/0243472 A1 | 10/2011 | Chang et al. | |
| 2012/0075493 A1* | 3/2012 | Singh et al. | 348/222.1 |
| 2013/0182780 A1* | 7/2013 | Alshin et al. | 375/240.29 |

* cited by examiner

*Primary Examiner* — Tuan Ho
(74) *Attorney, Agent, or Firm* — Kenyon & Kenyon LLP

(57) ABSTRACT

A video enhancement processing system improves perceptual quality of video data with limited processing complexity. The system may perform spatial denoising using filter weights that may vary based on estimated noise of an input image. Specifically, estimated noise of the input image may alter a search neighborhood over which the denoising filter operates, may alter a profile of weights to be applied based on pixel distances and may alter a profile of weights to be applied based on similarity of pixels for denoising processes. As such, the system finds application in consumer devices that perform such enhancement techniques in real time using general purpose processors such as CPUs or GPUs.

29 Claims, 7 Drawing Sheets

100

300

400

500

600

800

REAL TIME DENOISING OF VIDEO

CROSS-REFERENCE TO RELATED APPLICATIONS

The present invention benefits from priority of U.S. application Ser. No. 61/657,664, entitled "Real Time Denoising of Video," filed Jun. 8, 2012 and U.S. application Ser. No. 61/662,065, also entitled "Real Time Denoising of Video," filed Jun. 20, 2012. The contents of both documents are incorporated herein by reference.

BACKGROUND

The present invention benefits from priority of U.S. application Ser. No. 61/657,664, entitled "Real Time Denoising of Video," filed Jun. 8, 2012 and U.S. application Ser. No. 61/662,065, also entitled "Real Time Denoising of Video," filed Jun. 20, 2012. The contents of both documents are incorporated herein by reference.

The present disclosure relates to noise reduction in video data and, in particular, to real-time noise reduction techniques for such video data.

Many consumer electronic devices have camera systems that capture video data locally for storage or for delivery to other devices. The designs of the electronic devices may vary but, generally, the devices will include central processing units ("CPUs") and graphical processing units ("GPUs"), memory systems, and programming constructs, such as, operating systems and applications that manage the device's operation.

A camera system generally includes an image sensor and an image signal processor. The image sensor may generate an output video signal from incident light. The image sensor's output may include a noise component that can be considered to be white (no frequency dependence) with a signal-dependent variance due to shot noise. It is largely un-correlated between color component channels (Red, Green, Blue). The image signal processor may apply various processing operations to the video from the image sensor, including noise reduction, demosaicing, white balancing, filtering, and color enhancement. At the conclusion of such processes, the noise components of the video signal are no longer white. Instead, the video noise may depend on the video signal, its frequency, illuminant, and light level, and also may be correlated between channels.

The problem of correlated noise is very significant in consumer electronic devices that have small sensors. The problem may not be as acute in digital single-lens reflex ("DSLR") camera sensors where pixels may be fairly large. The problem may become particularly difficult, however, in consumer electronics devices for which the camera is merely a part of the system as a whole—laptop computer, tablet computers, smartphones, gaming systems and the like—where the sensors typically are less expensive and have smaller photodetector area to capture incident light. These sensors tend to have lower electron-well capacity, further deteriorating the signal-to-noise ratio ("SNR")—especially in low-light situations.

Compounding the problem, the camera pipeline introduces a number of artifacts such as false edges, sprinkles, and black/white pixel clumps that, from a signal point of view, are not noise (actually they appear more like structures). These artifacts severely degrade image quality in low light.

Although such noise effects might be mitigated by increasing exposure time, doing so introduces other artifacts such as motion blur.

Although some spatial denoising solutions have been proposed, the complexity of many such operations render them inappropriate for real time processing of video data (e.g., high definition video at 30 frames per second) by CPU- and/or GPU-based software systems.

Accordingly, the inventors perceive a need in the art for video enhancement processing techniques that improve perceptual quality of video data with limited processing complexity to be amenable to real time processing of video by software.

DETAILED DESCRIPTION

Embodiments of the present invention provide a video enhancement processing system that improves perceptual quality of video data with limited processing complexity. As such, the present invention finds application in consumer devices that perform such enhancement techniques in real time using general purpose processors such as CPUs or GPUs. Embodiments of the present invention may perform spatial denoising using filter weights that may vary based on estimated noise of an input image. Specifically, estimated noise of the input image may alter a search neighborhood over which the denoising filter operates, may alter a profile of weights to be applied based on pixel distances and may alter a profile of weights to be applied based on similarity of pixels for denoising processes.

Figure 1:
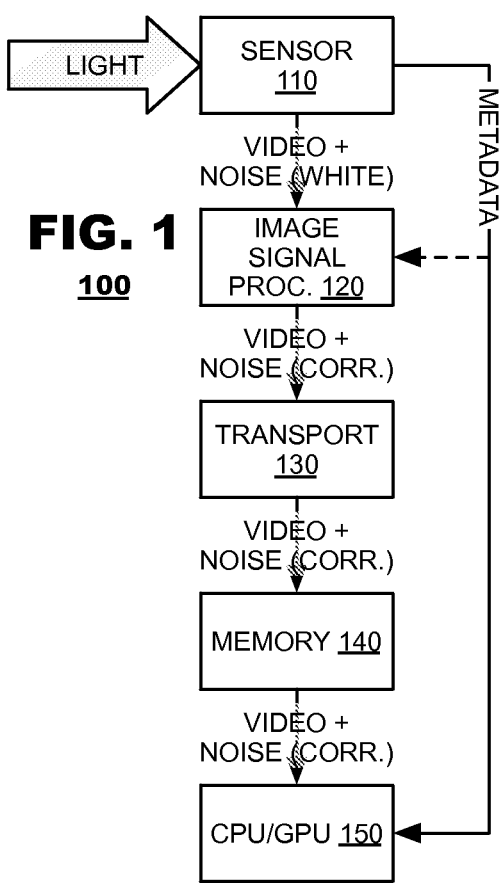
FIG. 1 is a simplified block diagram of a processing system according to an embodiment of the present invention.

FIG. 1 is a simplified block diagram of a processing system 100 according to an embodiment of the present invention. The system 100 may include: an image sensor 110, an image signal processor ("ISP") 120, a transport system 130, a memory 140 and a processing system 150. The image sensor 110 may capture image information and generate video data therefrom. The video data may include a noise component associated with parameters of the image sensor (pixel size, integration times, etc.). The ISP 120 may process the video data according to a variety of processing techniques and may output processed data to other components of the device. For example, the ISP 120 may perform functions of analog-to-digital conversion, Bayer interpolation, image scaling, distortion correction, gamma correction and the like. These processes operate on video components and noise components of the input signal. Although noise is expected to have a Gaussian distribution when input to the ISP 120, the ISP's processes may alter the behavior of the noise component, rendering it as correlated noise.

Processed video data from the ISP 120 may be output to the transport system 130 and stored in memory 140 for later use. The processing system 150 represents processing operations that may consume the processed video. For example, the processing system 150 may include CPUs and/or GPUs that cause the video data to be displayed by the device 100. Alternatively, the video data may be transmitted by the device 100 to other devices (not shown in FIG. 1), for example by wireline or wireless transmission. Further, the video data may be processed by application programs (also not shown) that execute on the device. The processing system 150 may perform video enhancement processing, according to an embodiment of the present invention, to remove noise from the video before it is consumed.

In the system 100 illustrated in FIG. 1, the image sensor 110 and ISP 120 typically are implemented as discrete integrated circuits but, in some applications, they may be implemented as a combined system on a chip. The behavior of noise components within the video signals output by these components typically are dictated by design limitations of the sensor 110 and ISP 120. Designers of consumer electronic devices have limited opportunities to adjust the behavior of such devices, particularly if they purchase the sensor 110 and/or ISP 120 from vendors. Accordingly, if the noise performance of such devices 110, 120 is unsatisfactory, the device designers may be compelled to design remediation solutions in software to be executed on other devices, represented by the processing system 150, where processing speeds are lower than dedicated hardware systems.

Figure 2:
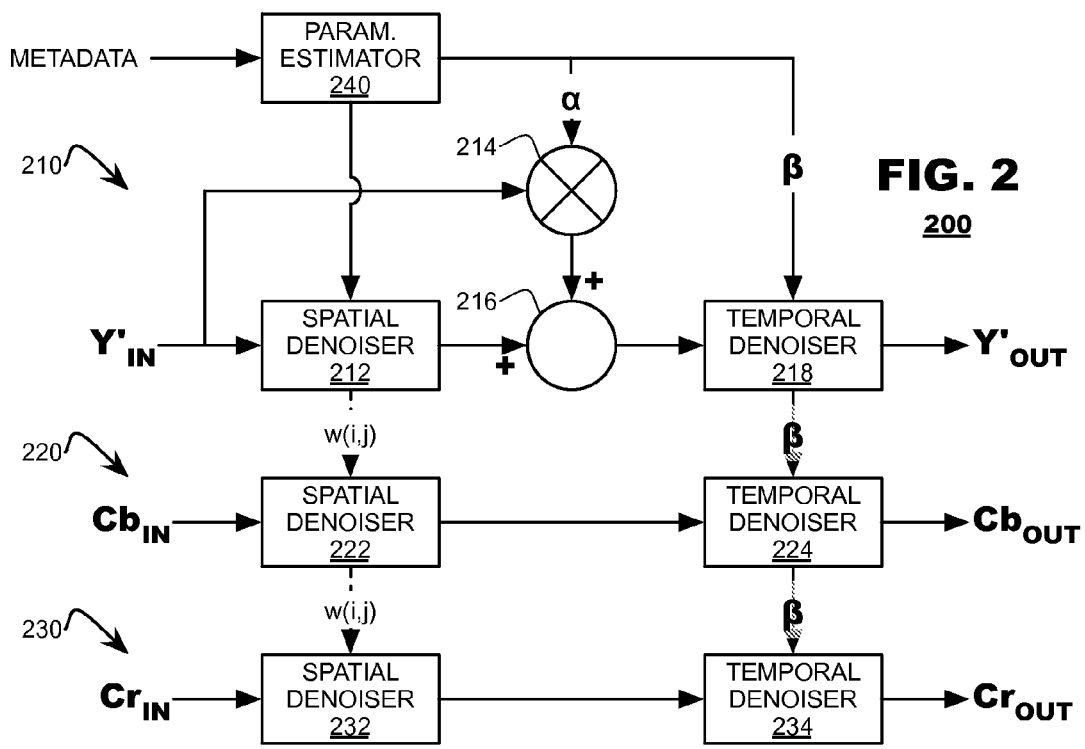
FIG. 2 is a block diagram of a video enhancement system according to an embodiment of the present invention.

FIG. 2 is a block diagram of a video enhancement system according to an embodiment of the present invention. The system 200 may include processing chains 210, 220, 230 for luma ($Y'_{IN}$) and a pair of chroma ($Cb_{IN}$, $Cr_{IN}$) video components and a parameter estimator 240.

The luma processing chain 210 may include a spatial denoiser 212, a multiplier 214, an adder 216 and a temporal denoiser. The spatial denoiser 212 may have an input for source luma data ($Y'_{IN}$) and may generate a spatially denoised luma signal at its output which may be input to the adder 216. The multiplier 214 may have an input for the source luma data ($Y'_{IN}$) and for a control parameter (a) from the parameter estimator 240. The multiplier 214 may scale the source luma data according to the control parameter α, which may be input to the adder 216. The adder 216 may add the data from the spatial denoiser 212 and the multiplier 214. An output from the adder 216 may be input to a temporal denoiser 218. The temporal denoiser 218 also may have an input for a second control parameter (β) from the parameter estimator 240.

The chroma processing chains 220, 230 each may include a spatial denoiser 222, 232 and a temporal denoiser 224, 234. The spatial denoiser 222, 232 each may have an input for respective chroma data ($Cb_{IN}$, $Cr_{IN}$ respectively). The temporal denoisers 224, 234 each may have an input coupled to an output of the respective spatial denoiser 222, 232 and an input for the control parameter (β) from the parameter estimator 240.

During operation, the parameter estimator 240 may receive metadata from the image sensor 110 and/or ISP 120 from which the parameter estimator 240 may estimate noise components of the input data. The metadata may include SNR estimates, and/or noise estimates such as those based on analog gains, exposure time and/or scene luminance. Based on the input metadata, the parameter estimator 240 may select control parameters α, β for use by the multiplier 214 and temporal denoiser 218. In an embodiment, α values may vary inversely with variation in noise estimates of the input image data and β values may vary along with variation in noise estimates.

Input luma data ($Y'_{IN}$) may be input to the spatial denoiser 212 and the multiplier 214. In response, the spatial denoiser 212 may output data representing spatially denoised luma data. The multiplier 214 may receive the parameter α from the parameter estimator 240 and may scale the input luma data $Y'_{IN}$ according to the parameter α. The adder 216 may add the denoised luma data output from the spatial denoiser 212 to the scaled luma data output from the multiplier 214. The resultant luma signal may be input to the temporal denoiser 218, which may apply temporal denoising operations at a filtering strength determined by the parameter β.

Operation of the spatial denoiser 212 in the luma processing chain 210 may generate filtering weights w(i,j) around each pixel p(x,y) of interest, based on degrees of similarity and/or distance of each pixel p(i,j) in a neighborhood about the pixel p(x,y). The spatial denoiser 212 may act as a spatial bilateral filter that performs a normalized weighted averaging of neighboring pixels. Accordingly, the adder 216 may output pixel data $p'_y(x,y)$ that may take a form:

$$p'_Y(x, y) = \alpha \cdot p_Y(x, y) + \frac{1}{\sum_{i,j \in R} w(i, j)} \left( \sum_{i,j \in R} w(i, j) \cdot p_Y(i, j) \right),$$

where
$p_Y(x,y)$ represents the luma component of the input pixel p(x,y) and R represents a size of a neighborhood over which denoising occurs. In an embodiment, the spatial denoiser 212 may vary weights based on comparisons of the luma component $p_Y(x,y)$ of each pixel and the luma component $p_Y(i,j)$ of pixels within a neighborhood as determined by a size R. The spatial denoiser 212 also may vary weights based on distance of similar pixels p(i,j) from the input pixel p(x,y). In a further embodiment, the weights to be assigned based on degrees of similarity, the weights to be assigned based on distance and the size R of neighborhoods may vary based on noise estimates of the input image.

The spatial denoiser 212 of the luma processing chain 210 may derive weights based on comparisons performed on luma components of pixel data and may output the derived weights to spatial denoisers 222, 232 of the two chroma processing chains 220, 230. The spatial denoisers 222, 232 of those processing chains 220, 230 may perform denoising processes using the weights derived from the luma processing chain 210, which may simplify operation of those processing chains 220, 230. The spatial denoisers 222, 232 of those processing chains 220, 230 need not perform their own comparison of pixel component data and derivation of weights.

In an embodiment, the control parameter a may determine a contribution of the original source luma signal to the output of the adder 216. Controlled addition of the source luma signal may prevent over filtering that may occur in bilateral filtering. Alternatively, rather than add source luma as a function of α, the system may apply lower filtering strengths on luma signals $Y'_{IN}$ than the chroma signals $Cb_{IN}$ or $Cr_{IN}$. When input data is over filtered, it can tend to generate output video data that looks "plasticky"—surfaces of natural objects may look unnaturally smooth. By reintroducing some component of the source luma signal into the filtered luma data and by modulating the contribution of the source luma signal by the control parameter α, the luma processing chain 210 may avoid imposing plasticky effects on the output data.

Outputs of the adder 216 and the spatial denoisers 222, 232 of the two chroma processing chains 220, 230 may be input to respective temporal denoisers 218, 224, 234. In an embodiment, the temporal denoisers 218, 224, 234 each may be provided as Kalman filters. In an embodiment of the present invention, strength of the temporal denoisers 218, 224, 234 may be controlled by the parameter β, which may vary in accordance with variation in noise. For input images with low noise, the β parameter may be set to relatively low values which may limit contribution of the temporal denoisers 218, 224, 234.

In implementation, the multiplier 214 and adder 216 may be performed by a GPU as a mix instruction which applies a mixing function as:

$$Y'int = \alpha \cdot j + (1-\alpha) \cdot k, \text{ where}$$

k represents the input luma $Y'_{IN}$, j represents spatially denoised input luma $Y'_{IN}$, and $Y'_{INT}$ represents intermediate results obtained prior to temporal denoising.

The principles of the present invention find application with a variety of different formats of image data. For example, although independent processing chains 210-230 have been illustrated for Y', Cb and Cr data respectively, the present invention finds application with any YCC format scheme that may be available, including, for example, 4:4:4, 4:2:2 and 4:2:0 YCC formats. In such instances where chroma color components do not coincide spatially with their luma counterparts, weights for spatial denoisers of the chroma processing chains 220, 230 may be derived from the luma weights by spatial interpolation.

The principles of the present invention also may be applied to other systems that operate on other device-dependent or device-independent color spaces, for example, a red-green-blue color space. In such a color space, operations of the luma processing chain 210 may be applied to green color component signals and operations of the chroma processing chains 220, 230 may be applied to the red and blue color component signals, respectively. Moreover, although the foregoing discussion has discussed application to non-linear gamma corrected luminance signals (luma or (Y')) and chrominance (chroma (Cb, Cr)), the principles of the present invention also may be applied to source luminance signals Y and source chrominance signals based on the color difference components B-Y and R-Y prior to gamma correction.

Figure 3:
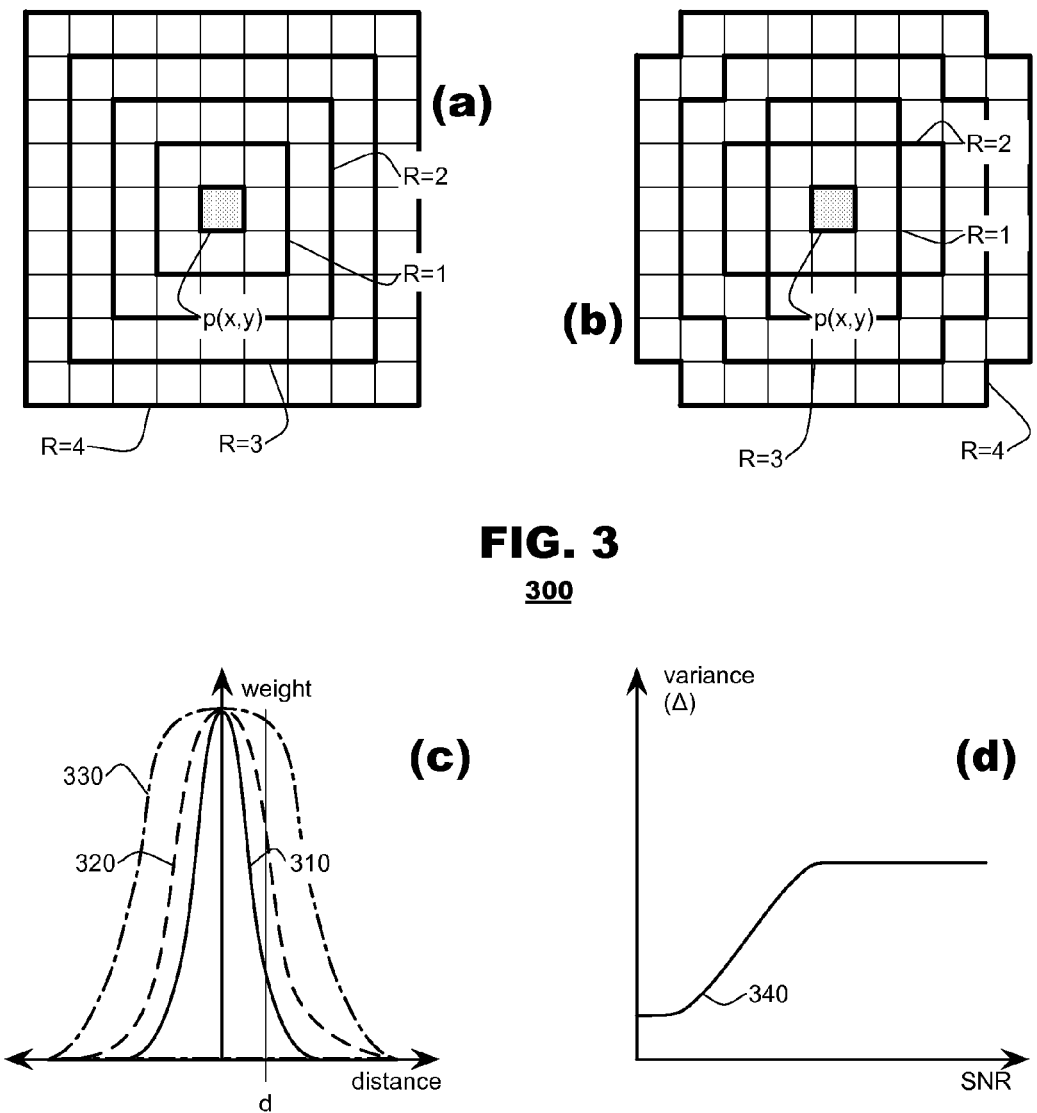
FIG. 3 illustrates variation of weights according to various embodiments of the present invention.

FIG. 3 illustrates variation of weights according to various embodiments of the present invention. FIGS. 3(a)-3(b), for example, illustrate variation of neighborhood sizes (R) that may occur according to embodiments of the present invention. As indicated, the size of neighborhoods over which the spatial filters operate may vary based on SNR or brightness of an image being processed. For images of relatively high levels of luminance, the neighborhood size R may be set to a relatively small size (e.g., R=1 or 2). For images having lower levels of luminance, the neighborhood size R may be set to larger sizes (e.g., R=3 or 4).

The neighborhoods may be set to be regular arrays of pixels surrounding a pixel of interest, for example, a square R×R block surrounding the pixel p(x,y) of interest, or may be set to another geometric shape (circular, octagonal, or otherwise) having a "radius" R. Again, R may vary based on SNR of the input image.

FIGS. 3(c)-3(d) illustrate variation of weights according to other embodiments of the present invention. As illustrated in FIG. 3(c), weights may vary based on each neighboring pixel's p(i,j) distance to the pixel p(x,y) of interest. Different sets of weights may be applied based on noise estimates of the input image. For example, FIG. 3(c) illustrates three different curves 310, 320, 330 representing variation of weights by distance at different noise levels. Curve 310 may be appropriate for input images having a relatively low noise. Pixels at relatively close distances are assigned high weights under the curve 310 but the weights of pixels diminish quickly by distance as compared to the other curves 320, 330. Curve 330 may be appropriate for input images having relatively high noise. Pixels have higher weights at farther distances from the input pixel than for curves 310 or 320. Curve 320 represents a weight profile that may be used for images at intermediate noise levels.

As illustrated in FIG. 3(c), a pixel p(i,j) at a distance d from the pixel p(x,y) may be assigned different weights depending on the noise level of the input image. If the input noise causes the weight profile represented by curve 310 to be active, then the pixel p(i,j) would be assigned a fairly low weight. If the input image has an intermediate noise level such that the curve 320 is activated, the pixel p(i,j) at distance d would be assigned a relatively higher weight (than for curve 310). And, if the input image has a low noise level such that the curve 330 is activated, then the pixel p(i,j) at distance d would be assigned a weight as determined by curve 330—the highest weight of the three illustrated curves 310-330. In implementation, the curves 310-330 may be pre-calculated and stored in a look up table for run time use. Alternatively, they may be calculated during run time.

FIG. 3(d) illustrates a weighting curve 340 representing variation of similarity (Δ) based on SNR. For relatively low levels of SNR, the similarity measures A may have relatively low levels. The similarity measures Δ may increase with increasing SNR. In an embodiment, the similarity measures Δ may reach a plateau at a predetermined SNR level. In an embodiment, the spatial denoisers 218, 222, 232 (FIG. 2) may compare a neighboring pixel p(i,j) to a pixel of interest p(x,y) to determine whether they are similar to each other within a governing similarity measure Δ. If so, the spatial denoiser 218, 222, 232 may use the neighboring pixel p(i,j) for denoising the pixel of interest p(x,y).

In another embodiment, weight may be derived by applying Gaussian curves for both the distance weighting and the similarity weighting. Given a pixel of interest p(x,y), neighboring pixels that are similar (e.g. delta near zero) may be assigned a higher similarity weight, which is expressed in the Gaussian curve as a higher value near zero. The distance and similarity weights are combined as a product to form a final weight for the neighboring pixel p(i,j). Further, the Gaussian curve may be scaled such that it effectively has a lower sigma-R for very low luma (closer to curve 310, than to curve 330).

Determination of a final weight may occur in a variety of ways. For example, for frames having relatively high SNR (low noise), the radius may be decreased, as is the value for sigma-D (closer to curve 310 than to curve 330), so spatially further neighbors have lower weights, or zero weight. For frames having relatively higher SNR (lower noise), there may be a lower sigma-R, so more dissimilar pixels may have lower weights.

In another embodiment, the weighting curve of FIG. 3(d) may be varied based on image brightness. For example, the weighting curve may reduce filtering for very dark areas (luma-adaptive filtering) and increase filtering for bright areas. Thus, the weighting curve becomes a function of both SNR and luma.

The curves illustrated in FIGS. 3(a)-3(d) are merely exemplary. The principles of the present invention find application with curves having different profiles, for example, curves with discrete jumps among different weight levels, stepped curves and curves having zero weight values beyond threshold distances and SNR values.

Figure 4:
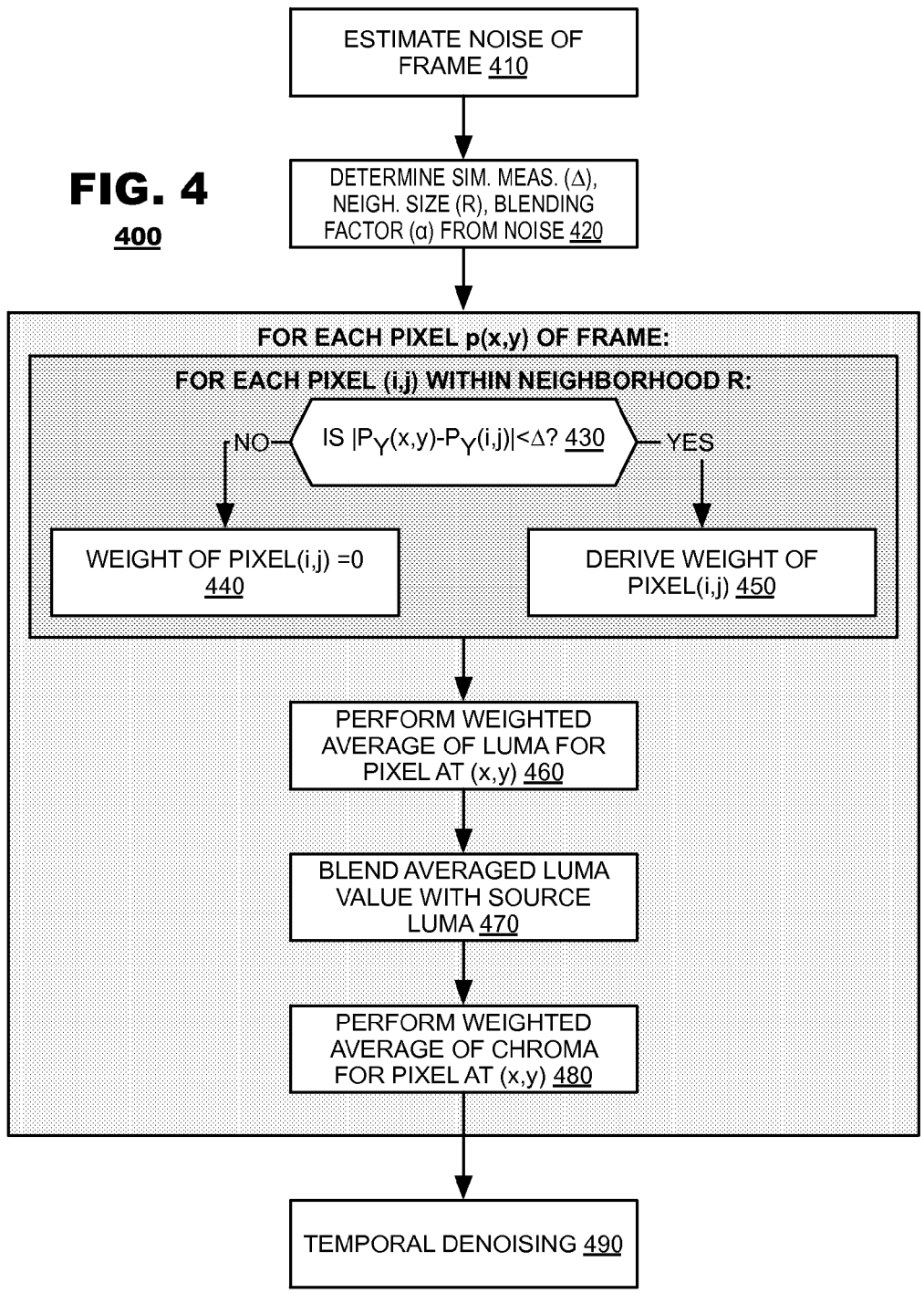
FIG. 4 illustrates a method of operation according to an embodiment of the present invention.

FIG. 4 illustrates a method 400 of operation according to an embodiment of the present invention. The method may begin by estimating the SNR of a new frame to be processed (box 410). Based on the SNR, the method 400 may determine a similarity measure Δ, size R and blending factor α for processing pixels within the frame (box 420).

For each pixel p(x,y) of the input frame, the method 400 may compare the pixel to pixels p(i,j) within a neighborhood R. Specifically, the method 400 may compare luma components $p_y$ of the pixels to each other, determine a difference between them and compare them to the similarity measure Δ (box 430). If the difference exceeds the similarity measure, then the neighboring pixel p(i,j) may be prevented from contributing to the denoising operation (mathematically, its weight may be set to zero) (box 440). If the difference does not exceed the similarity measure, however, then the neighboring pixel p(i,j) may be assigned a weight based on the pixel's distance from pixel p(x,y) and, optionally, also based on a degree to which the neighboring pixel p(i,j) is similar to pixel p(x,y) (box 450). Once all neighboring pixels have been considered for pixel p(x,y), the method 400 may perform an average of luma components of the pixel p(x,y) and the neighboring pixels p(i,j) according to their assigned weights (box 460). The method 400 may blend the averaged value obtained at box 460 with luma value $p_y(x,y)$ of the source pixel according to the blending factor α (box 470).

Following operation of box 470, the method may perform weighted averaging of chroma components $p_{Cb}(x,y), p_{Cr}(x,y)$ of the pixel (box 480). Weighted averaging may apply weights derived from operation of boxes 430-450. Following operation of boxes 470 and 480, the method 400 will have generated spatially denoised pixel data for the frame. FIG. 4 also illustrates operation of temporal denoising (box 490), which may be performed independently on the luma and chroma components of pixel data obtained by boxes 470 and 480.

Operation of the method 400 of FIG. 4 finds application in consumer electronic devices that perform real-time denoising in software. In such systems, processing power of on-board CPUs and/or GPUs may be limited. The method 400 provides an appropriate trade off between limiting processing complexity and improvement to video quality within such constraints.

Figure 5:
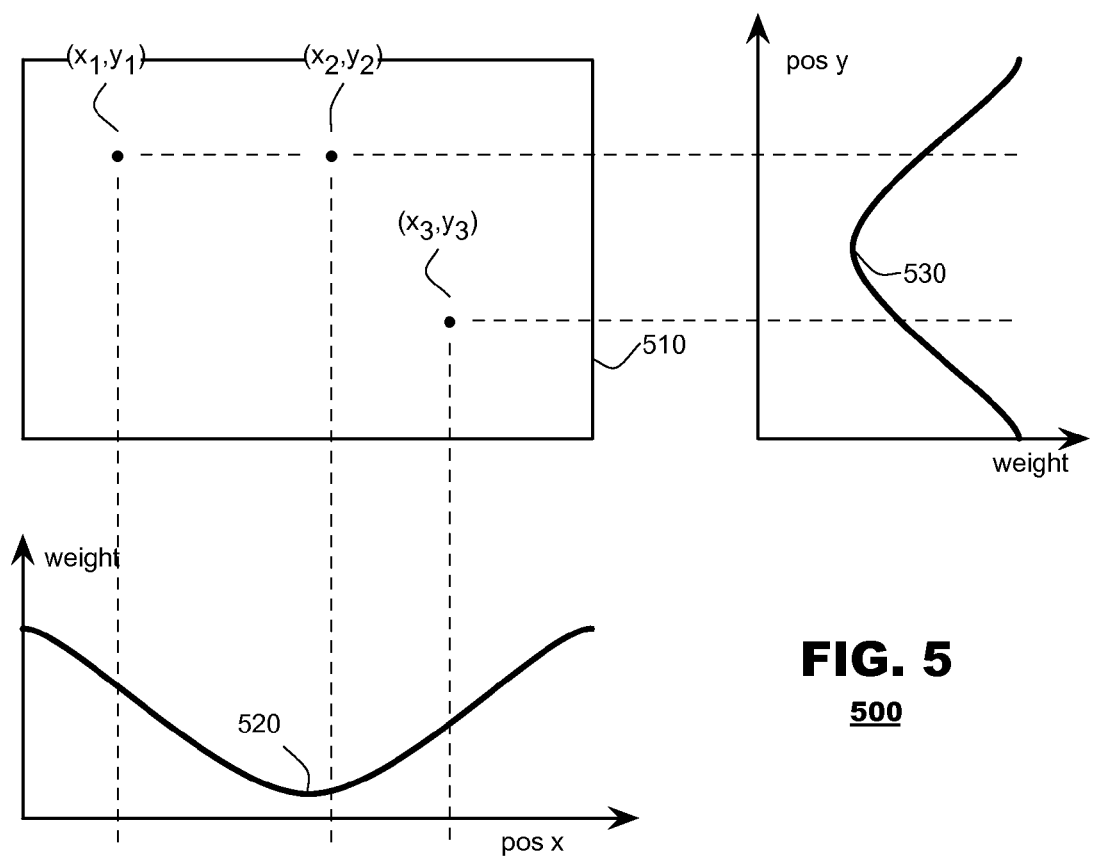
FIG. 5 illustrates variation among weights at different pixel locations according to other embodiments of the present invention.

In another embodiment, illustrated in FIG. 5, weights may vary based on each pixel's location within an input frame 510. FIG. 5 illustrates exemplary weighting curves 520, 530 illustrating variation among weights at different pixel locations. Curve 520, for example, illustrates that relatively larger weights may be applied to pixels that are closer to horizontal edges of the frame 510 and relatively smaller weights may be applied to pixels that are closer to the horizontal center of the frame 510. Similarly, curve 530 illustrates that relatively larger weights may be applied to pixels that are closer to vertical edges of the frame 510 and relatively smaller weights may be applied to pixels that are closer to the vertical center of the frame 510.

During operation, each pixel's weight may be derived by the pixel's horizontal and vertical location within the frame and the weight distributions of each. For example, FIG. 5 illustrates two exemplary pixels at locations (x1,y1) and (x2, y2), where y1=y2. In this example, since the pixels are provided in a common row, they may have common vertical weight contributions. The two pixels have different horizontal locations and, therefore, they may map to different horizontal weight contributions.

Figure 6:
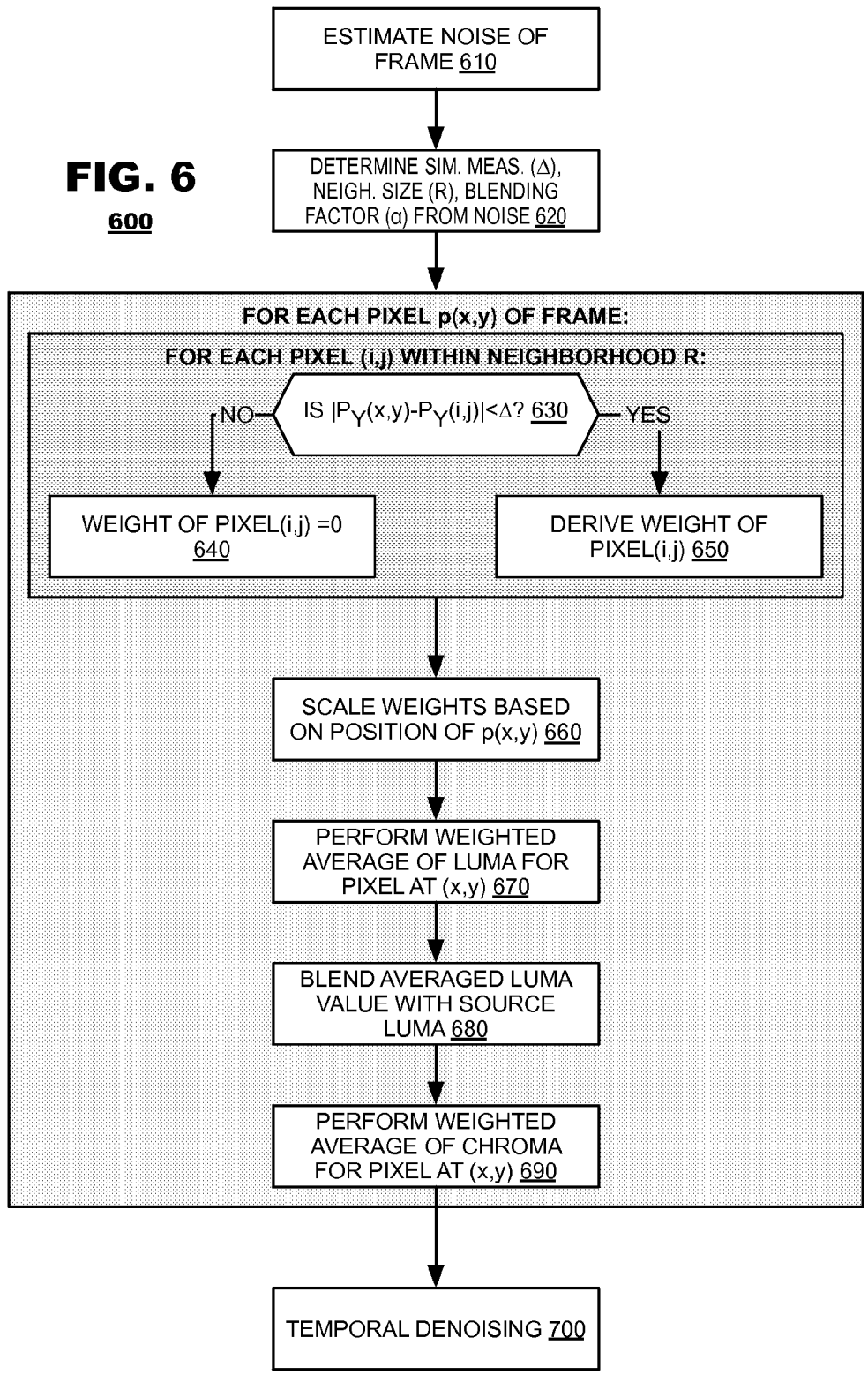
FIG. 6 illustrates a method of operation according to an embodiment of the present invention.

FIG. 6 illustrates a method 600 of operation according to an embodiment of the present invention. The method may begin by estimating the SNR of a new frame to be processed (box 610). Based on the SNR, the method 600 may determine a similarity measure Δ, size R and blending factor α for processing pixels within the frame (box 620).

For each pixel p(x,y) of the input frame, the method 600 may compare the pixel to pixels p(i,j) within a neighborhood R. Specifically, the method 600 may compare luma components $p_y$ of the pixels to each other, determine a difference between them and compare them to the similarity measure Δ (box 630). If the difference exceeds the similarity measure, then the neighboring pixel p(i,j) may be prevented from contributing to the denoising operation (mathematically, its weight may be set to zero) (box 640). If the difference does not exceed the similarity measure, however, then the neighboring pixel p(i,j) may be assigned a weight based on the pixel's distance from pixel p(x,y) and, optionally, also based on a degree to which the neighboring pixel p(i,j) is similar to pixel p(x,y) (box 650). The method 600 further may modify the weights based on the (x,y) location of the pixel p(x,y) of interest (box 660). Once final weights have been assigned for pixel p(x,y), the method 600 may perform an average of luma components of the pixel p(x,y) and the neighboring pixels p(i,j) according to their assigned weights (box 670). The method 600 may blend the averaged value obtained at box 670 with a luma value $p_Y(x,y)$ of the source pixel according to the blending factor α (box 680).

Following operation of box 680, the method may perform weighted averaging of chroma components $p_{Cb}(x,y), p_{Cr}(x,y)$ of the pixel (box 690). Weighted averaging may apply weights derived from operation of boxes 630-660. Following operation of boxes 680 and 690, the method 600 will have generated spatially denoised pixel data for the frame. FIG. 6 also illustrates operation of temporal denoising (box 700), which may be performed independently on the luma and chroma components of pixel data obtained by boxes 680 and 690.

Operation of the method 600 of FIG. 6 finds application in consumer electronic devices that perform real-time denoising in software. In such systems, processing power of on-board CPUs and/or GPUs may be limited. The method 600 provides an appropriate trade off between limiting processing complexity and improvement to video quality within such constraints.

Figure 7:
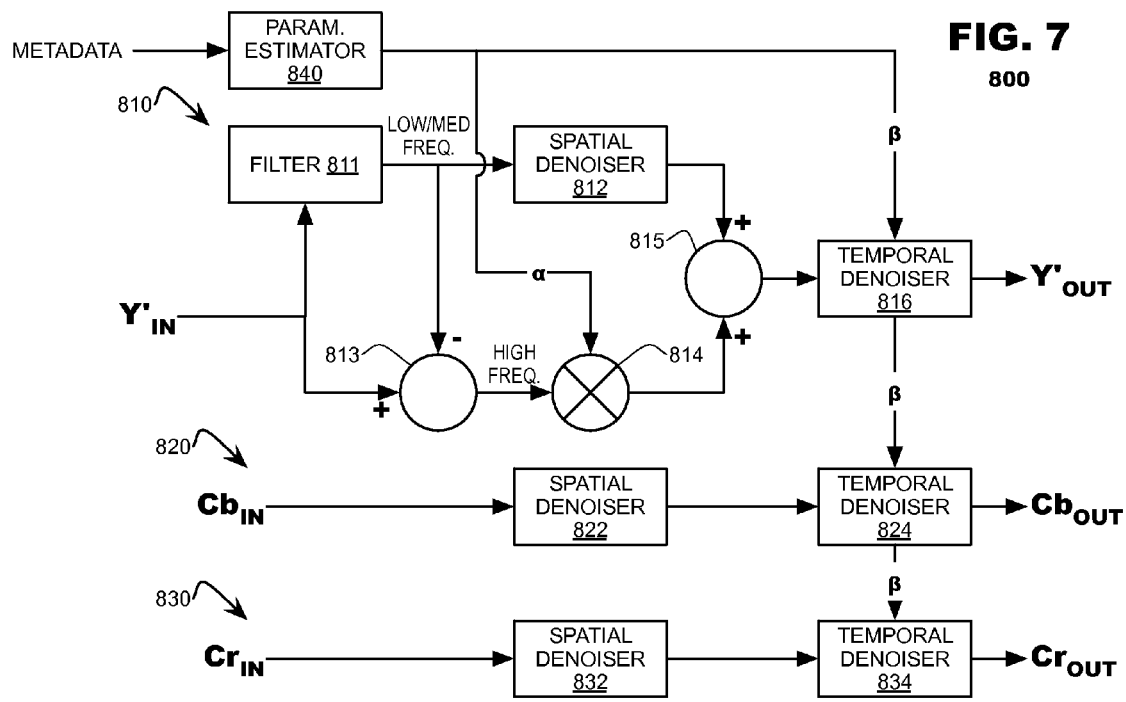
FIG. 7 is a block diagram of a video enhancement system according to an embodiment of the present invention.

FIG. 7 is a block diagram of a video enhancement system 800 according to an embodiment of the present invention. The system 800 may include processing chains 810, 820, 830 for luma ($Y'_{IN}$) and a pair of chroma ($Cb_{IN}$, $Cr_{IN}$) video components and a parameter estimator 840.

The luma processing chain 810 may include a filter 811, a spatial denoiser 812, a subtractor 813, a multiplier 814, an adder 815 and a temporal denoiser 816. The filter 811 may have an input for source luma data ($Y'_{IN}$) and an output for filtered luma data. The spatial denoiser 812 may have an input coupled to an output of the filter 811 which may be input to the adder.

The subtractor 813 may have an input for the source luma data ($Y'_{IN}$) and a second input coupled to an output of the filter 811. Thus, the output of the subtractor 813 may represent high frequency components of the input luma data. The multiplier 814 may have an input coupled to the subtractor 813 and a control input α from the parameter estimator 840. An output of the multiplier 814 may be input to the adder 815. An output from the adder 815 may be input to the temporal denoiser 816, which may receive a second control input β from the parameter estimator 840.

The chroma processing chains 820, 830, each may include a spatial denoiser 822, 832 and a temporal denoiser 824, 834. The spatial denoiser 822, 832 each may have an input for respective chroma data ($Cb_{IN}$, $Cr_{IN}$, respectively). The temporal denoisers 824, 834 each may have an input coupled to an output of the respective spatial denoiser 822, 832 and an input for the control parameter β from the parameter estimator 840.

During operation, the parameter estimator 840 may receive metadata from the image sensor 110 and/or ISP 120 (FIG. 1) from which the parameter estimator 840 may estimate noise components of the input data. The metadata may include SNR estimates, and operational settings data of the camera such as analog gain settings, exposure time settings and the like. Based on the input metadata, the parameter estimator 840 may select control parameters α, β for use by the multiplier 814 and temporal denoisers 816, 824, 834. In an embodiment, a values may vary inversely with variation in SNR values of the input image data and β values may vary along with variation in SNR values.

Input luma data ($Y'_{IN}$) may be input to the filter 811 and the subtractor 813. The filter 811 may separate high frequency components from low-to-medium frequency components of the input frame. Differentiation between high frequencies and low-to-medium frequencies may vary based on noise estimates or other characteristics of the captured video. For example, for bright light video, a 3 pixel×3 pixel box filter may be used to identify high frequency content. For low light video, a 5×5 box filter may be used instead to identify high frequency content. The filter 811 may generate output to the spatial denoiser 812 and the subtractor 813 data representing image content of the frame at low-to-medium frequency components. The spatial denoiser 812 may operate as a bilateral filter and may output filtered image data to the adder 815.

The subtractor 813 may subtract on a pixel-by-pixel basis the source luma signal from the filtered luma signal output by the filter 811. The output of the subtractor 813 may represent high frequency components of the source luma signal. The multiplier 814 may receive the α parameter from the parameter estimator 840 and may scale high frequency luma data $Y'_{IN}$ according to the parameter α. The adder 815 may add filtered luma data output from the spatial denoiser 812 to the scaled luma data output from the multiplier 814. The resultant luma signal may be input to the temporal denoiser 816, which may apply temporal denoising operations at a filtering strength determined by the β parameter.

In one embodiment, operation of the spatial denoiser 812 may operate as a traditional bilateral filter without regard to SNR estimates from the parameter estimator 840. The spatial denoiser 812 may generate filtering weights w(i,j) around each pixel p(x,y) of interest, based on degrees of similarity and/or distance of each pixel p(i,j) in a neighborhood about the pixel p(x,y). Accordingly, the adder 815 may output pixel data $p'_Y(x,y)$ according to:

$$p'_Y(x, y) = \alpha \cdot p_Y(x, y) + \frac{1}{\sum_{i,j \in R} w(i, j)} \left( \sum_{i,j \in R} w(i, j) \cdot p_Y(i, j) \right),$$

where
$p_Y(x,y)$ represents the luma component of the input pixel p(x,y) and R represents a size of a neighborhood over which denoising occurs.

In another embodiment, the spatial denoiser 812 may vary weights based on comparisons of the luma component $p_Y(x,y)$ of each pixel and the luma component $p_Y(i,j)$ of pixels within a neighborhood as determined by a size R. The spatial denoiser 812 also may vary weights based on distance of similar pixels p(i,j) from the input pixel p(x,y). In a further embodiment, the weights to be assigned based on degrees of similarity, the weights to be assigned based on distance and the size R of neighborhoods may vary based on SNR of the input image.

The spatial denoiser 812 of the luma processing chain 810 may derive weights based on comparisons performed on luma components of pixel data and may output the derived weights to spatial denoisers 822, 832 of the two chroma processing chains 820, 830. The spatial denoisers 822, 832 of those processing chains may perform denoising processes using the weights derived from the luma processing chain 810, which may simplify operation of those processing chains 820, 830. The spatial denoisers 822, 832 of those processing chains need not perform their own comparison of pixel component data and derivation of weights.

In an embodiment, the control parameter α may determine a contribution of the original source luma signal to the output of the adder 815. Controlled addition of the source luma signal may prevent over filtering that may occur in bilateral filtering. Alternatively, rather than add source luma as a function of α, the system may apply lower filtering strengths on luma signals VIN than the chroma signals $Cb_{IN}$ or $Cr_{IN}$. When input data is over filtered, it can tend to generate output video data that looks plasticky. By reintroducing some component of the source luma signal into the filtered luma data and by modulating the contribution of the source luma signal by the control parameter α, the luma processing chain 810 may avoid imposing plasticky effects on the output data.

Outputs of the adder 815 and the spatial denoisers 822, 832 of the two chroma processing chains 820, 830 may be input to respective temporal denoisers 816, 824, 834. In an embodiment, the temporal denoisers 816, 824, 834 each may be provided as Kalman filters. In an embodiment of the present invention, strength of the temporal denoisers 816, 824, 834 may be controlled by the parameter β, which may vary in accordance with variation in noise. For input images with low noise, the β parameter may be set to relatively low values which may limit contribution of the temporal denoisers 816, 824, 834.

The principles of the present invention find application with a variety of different formats of image data. For example, although independent processing chains 810-830 have been illustrated for Y', Cb and Cr data respectively, the present invention finds application with any YCC format scheme that may be available, including for example 4:4:4, 4:2:2 and 4:2:0 YCC formats. In such instances where chroma color components do not coincide spatially with their luma counterparts, weights for spatial denoisers of the chroma processing chains 820, 830 may be derived from the luma weights by spatial interpolation.

The principles of the present invention also may be applied to other systems that operate on other device-dependent or device-independent color spaces, for example, a red-green-blue color space. In such a color space, operations of the luma processing chain 810 may be applied to green color component signals and operations of the chroma processing chains 820, 830 may be applied to the red and blue color component signals, respectively. Moreover, although the foregoing discussion has discussed application to non-linear gamma corrected luminance signals (luma or (Y')) and chrominance (chroma (Cb, Cr)), the principles of the present invention also may be applied to source luminance signals Y and source chrominance signals based on the color difference components B-Y and R-Y prior to gamma correction.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video processing method, comprising:
spatially filtering a first color component of an input frame generating filtered first color data therefrom,
blending the filtered first color data with a source luma data according to a weight factor derived from the input frame,
temporally filtering the blended first color data using a control parameter that varies inversely with the weight factor,
spatially filtering and temporally filtering other color components of the input frame wherein the temporally filtering of the other color components use the control parameter for the first color component.

2. The method of claim 1, wherein the blending weight factor is derived from signal to noise estimates of the input frame.

3. The method of claim 1, wherein the blending weight factor is derived from exposure time read from an image sensor.

4. The method of claim 1, wherein the spatial filtering for first color component occurs by a bilateral filter.

5. The method of claim 1, wherein the spatial filtering for the first color component includes a weighted filtering in which weights of at least one first color pixel is derived based on a degree of similarity between a source first color pixel and neighboring first color pixels in the input frame.

6. The method of claim 5, wherein the spatial filtering for the other color components includes weighted filtering in which weights of a source other color pixel uses the weight of a co-located first color pixel.

7. The method of claim 5, wherein a search neighborhood of the neighboring pixels varies based on an estimate of signal to noise ratio of the input image.

8. The method of claim 1, wherein the spatial filtering for the first color component includes a weighted filtering in which weights of a source first color pixel is derived based on distance(s) between the source first color pixel and neighboring first color pixel(s) in the input frame that are similar to the source first color pixel within a predetermined degree of similarity.

9. The method of claim 8, wherein the spatial filtering for the other color components includes weighted filtering in which weights of a source other color pixel uses the weight of a co-located first color pixel.

10. The method of claim 8, wherein the degree of similarity varies based on an estimate of signal to noise ratio of the input image.

11. A video processing method, comprising:
spatially filtering a first color component of an input frame,
spatially denoising low frequency components of the filtered first color component,
scaling high frequency components of the filtered first color component,
blending the denoised low frequency first color components and scaled high frequency first color components;
temporally denoising the blended first color component data; and
spatially filtering and temporally filtering other color components of the input frame.

12. The method of claim 11, wherein the scaling factor is derived from signal to noise estimates of the input frame.

13. The method of claim 11, wherein the scaling factor is derived from exposure time read from an image sensor.

14. The method of claim 11, wherein the spatial filtering for the first color component includes a weighted filtering in which weights of a source first color pixel is derived based on a degree of similarity between the source first color pixel and neighboring first color pixels in the input frame.

15. The method of claim 14, wherein the spatial filtering for the other components includes weighted filtering in which weights of at least one other color pixel uses the weight of a co-located first color pixel.

16. The method of claim 14, wherein a search neighborhood of the neighboring pixels varies based on an estimate of signal to noise ratio of the input image.

17. The method of claim 11, wherein the spatial filtering for the first color component includes a weighted filtering in which weights of a source first color pixel is derived based on distance(s) between the source first color pixel and neighboring first color pixel(s) in the input frame that are similar to the source first color pixel within a predetermined degree of similarity.

18. The method of claim 17, wherein the spatial filtering for the other color components includes weighted filtering in which weights of at least one other color pixel uses the weight of a co-located first color pixel.

19. The method of claim 17, wherein the degree of similarity varies based on an estimate of signal to noise ratio of the input image.

20. A video processing system, comprising:
a processing system for a first color component of source image data, comprising:
a spatial denoiser,
a scaling unit having an input coupled to an output of the spatial denoiser,
an adder having inputs coupled respectively to the output of the spatial denoiser and an output of the scaling unit, and
a temporal denoiser having an input coupled to an output of the adder; and
processing systems for other color components of the source image data, each comprising a spatial denoiser and a temporal denoiser provided in series.

21. The system of claim 20, further comprising a parameter estimator generating a scaling control factor to the scaling unit based on a signal-to-noise ratio of the source image data.

22. The system of claim 20, further comprising a parameter estimator generating a scaling control factor to the scaling unit based on an exposure time associated with the source image data.

23. The system of claim 20, wherein the spatial denoiser of the first component processing system generates local weights for denoising processing and the weights are provided to the spatial denoisers of the other component processing systems as control inputs.

24. A video processing method, comprising:
estimating a similarity measure based on an estimated noise of an input image,
for a plurality of pixels in the input image:
searching a neighborhood of the input pixel for other pixels within the input image having luma values that are similar to a luma value of the input pixel,
deriving a weight to be applied to the pixel based on the search results,
performing a weighted averaging of the luma values of the pixels according to their respective weights,
blending the luma values obtained from the weighted averaging with a luma value of the source pixel; and
performing a weighted averaging of chroma values of the pixels according to their respective weights.

25. The method of claim 24, further comprising performing temporal denoising of the luma values and chroma values obtained from the luma blending and chroma weighted averaging respectively.

26. The method of claim 24, wherein the weights are derived based on differences in luma values among the source pixel and the neighboring pixels that are similar to the source pixel.

27. The method of claim 24, wherein the weights are derived based on distances between the source pixel and the neighboring pixels that are similar to the source pixel.

28. The method of claim 24, wherein the blending occurs according to a blending factor that varies based on signal-to-noise ratio of the input image.

29. The method of claim 24, wherein the blending occurs according to a blending factor that varies based on an exposure time associated with the input image.

* * * * *